Feb. 23, 1926.
M. T. CONROY
1,574,277
RIM AND TIRE CONSTRUCTION FOR VEHICLE WHEELS
Filed Oct. 14, 1924
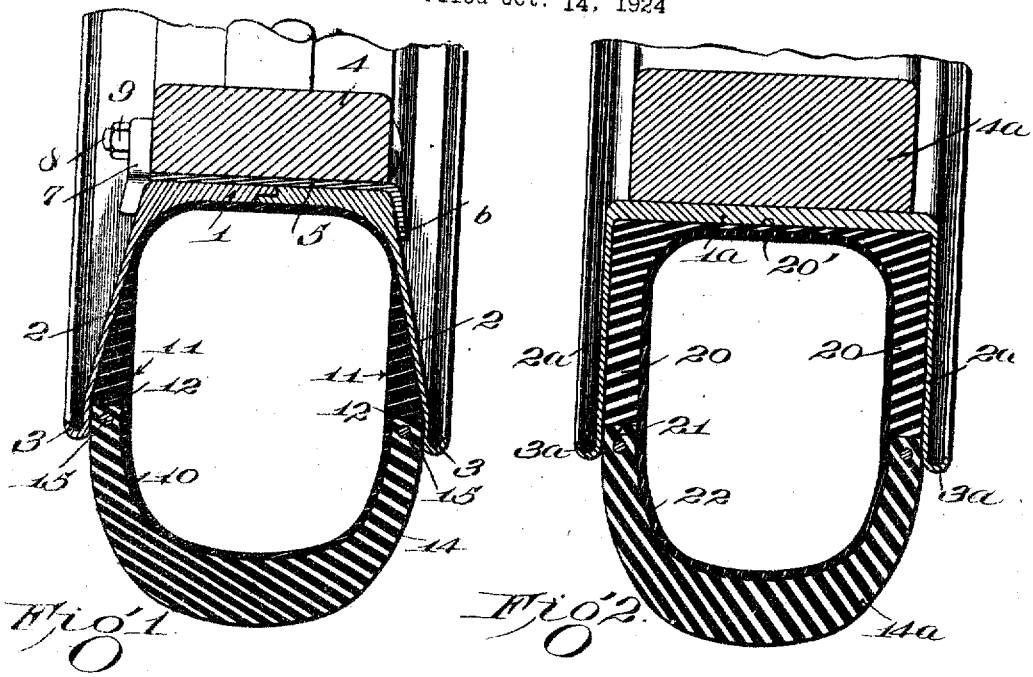
WITNESSES
INVENTOR
Michael T. Conroy
BY
ATTORNEYS Patented Feb. 23, 1926.

1,574,277

UNITED STATES PATENT OFFICE.

MICHAEL T. CONROY, OF AKRON, OHIO, ASSIGNOR OF ONE-HALF TO HENRY M. GROUE, OF CUYAHOGA FALLS, OHIO.

RIM AND TIRE CONSTRUCTION FOR VEHICLE WHEELS.

Application filed October 14, 1924. Serial No. 743,605.

*To all whom it may concern:*

Be it known that I, MICHAEL T. CONROY, a citizen of the United States, and resident of Akron, in the county of Summit and State of Ohio, have invented certain new and useful Improvements in Rim and Tire Constructions for Vehicle Wheels, of which the following is a specification.

My invention relates to an improvement in rim and tire constructions for vehicle wheels, and it consists in the combinations, constructions and arrangements herein described and claimed.

An object of the invention is to provide a rim and tire construction in which the tire is permitted to have radial flexure inward in the rim and is held against any appreciable lateral expansion in response to pressure on the tread of the tire, whereby a tire having a given air capacity will be capable of sustaining a relatively great load without rupture or distortion.

A further object of the invention is the provision of a rim and tire construction which is adapted to be conveniently and easily applied to the felloe of a wheel.

A still further object of the invention is the provision of a rim and tire construction which is adapted to be manufactured at a relatively low cost and which is adapted to last a relatively long time in the service for which it is intended.

Other objects and advantages will be apparent from the following description, considered in conjunction with the accompanying drawings, in which—

Figure 1 is a transverse vertical section through a rim and tire construction embodying the invention, and Figure 2 is a view similar to Figure 1, showing a modified form of the rim and tire construction.

The construction shown in Figure 1 includes an outer rim member 1 which may comprise an annular body formed of two complementary edgewise abutting annular sections, as shown, each of said sections being merged at its outer edge into a rim flange 2. The width of each rim flange 2, that is the distance radially from the line of juncture of the rim flange with the body of the rim member 1 to the outer edge of the rim flange is relatively great for an outer rim member having a body of a given width.

The rim flange 2 may be turned outwardly and then rearwardly at its outer edge, as at 3 to provide a stiffening flange at the outer edge of the rim flange.

The outer rim member 1 may be secured releasably on the felly 4 of a vehicle wheel in any suitable known manner, as by means of an intermediate rim member 5 which is secured on the felly 4 and on which the body of the rim member is mounted, the intermediate rim member 5 being provided at one edge with an outwardly extending flange 6 with which clamping lugs 7, which are located at the other edge of the body of the intermediate rim member 5, cooperate to hold the outer rim member against axial movement on the body of the intermediate rim member.

The lugs 7 are slidable on the end portions of bolts 8 which extend through the felly 4 in parallel relation, nuts 9 being adjustable on the ends of the bolts to clamp the lugs 7 against the adjacent edges of said rim members with a portion of each of the lugs in engagement with the adjacent rim flange 2 of the outer rim member.

The construction also includes an inner and pneumatic tube 10 which is adapted to be partially received between the rim flanges 2, the inner periphery of the tube 10 fitting snugly on the body of the outer rim member 1. The tube 10 is shown as being made of rubber, which of course is elastic. The portions of the side walls of the tube 10 which are received between the rim flanges 2 are enlarged externally from the junctures of said side walls of the tube 10 with the inner peripheral walls of the tube nearly but not quite to the junctures of the rim flanges 2 and the outwardly and rearwardly turned outer edge portions of said flanges, thus providing lateral annular beads or ribs 11 on the side walls of the tube 10, each of the beads or ribs 11 of the tube 10 decreasing in thickness from its outer edge to its line of juncture with the body of the tube 10. Annular shoulders as at 12 thus are provided at the outer edges of the ribs or beads 11, such shoulders being of less diameter than the outer diameter of each of the rim flanges 2 and being concentric with the outer rim 1. With the arrangement just described, the annular outer peripheral portion of the inner tube 10 extends radially outward beyond the outer edge portion of the rim flanges 2. A casing or tread member 14 for covering this extending outer peripheral portion of the tube 10 has a body which is annular in form and is adapted to closely overfit the extending outer peripheral portion of the tube 10, the body of the casing member 14 being substantially U-shaped in cross sectional contour both internally and externally and the side members thereof abutting at their inner edges with the shoulders 12. The tread member 14 may be made of any suitable material having good wear resisting properties and may have reinforcing wires imbedded therein as indicated at 15, such reinforcing wires preferably being located in the side members of the body of the casing 14 adjacent to and in encircling relation to the inner edges of said side members.

From the foregoing description of the various parts of the device, the operation thereof may be readily understood. The tube 10 is placed on the outer rim member 1 while in deflated condition and the tread member 14 is placed in encircling relation to the outer peripheral portion of the tube 10 with the sides of the casing 14 in abutting relation at their edges with the shoulders 12. The radial width of the portion of the tube 10 that is received between the flanges 2 of the outer rim member is at least half the radial distance between the outer and inner peripheral walls of the tube 10 and the ribs or beads 11 are sufficiently stiff to support the casing member 14 when the inner tube has been inflated so that the inner edge portions of the sides of the casing member 14 will be held between the outer edge portions of the flanges 2 of the outer rim member and the extending outer peripheral portion of the tube 10 without any appreciable change in the cross sectional contour of the inner wall of the tube 10 when the casing member 14 is subjected to shocks and jars on the outer periphery thereof. The casing member 14 is permitted to have limited radial movement inward between the rim flanges 2 of the outer rim member in response to shocks and jars on the outer peripheral wall or tread of the casing member 14, the body of the tube 10 of course being made of flexible elastic material and the enlargements 11 on the side walls thereof likewise having considerable inherent elasticity and resiliency. A relatively great stress or pressure on the outer peripheral wall of the tread member 14 thus will be yieldingly resisted and sustained by the tube 10 for a tube of a given air capacity.

The casing member 14 therefore may be of but relatively little area without any portion of the inner tube 10 being exposed to wear. The casing member 14 can be replaced at but relatively little cost and the expense incident to the keeping of a rim and tire construction embodying the invention in repair and in condition for use is relatively low.

The modification shown in Figure 2 includes an outer rim member $1^a$ which may be secured in any suitable known manner on a felly $4^a$ and which is provided at its opposite edges with outwardly extending integral rim flanges $2^a$ having outwardly and rearwardly curved marginal edge portions $3^a$. The rim flanges $2^a$ are shown as being substantially parallel to each other from their juncture with the body of the rim $1^a$ to the edge portions $3^a$ and as being provided with facing or cushion members 20 which may be made of solid rubber or rubberized fabric. The facing members 20 are secured to the inner faces of the rim flanges $2^a$ in any suitable known manner and are merged one into the other by an annular connecting strip 20' which cooperates with the inner ends of the members 20 to cover the outer face of the body of the outer rim $1^a$. The outer diameter of each of the members 20 is less than that of each of the rim flanges $2^a$ so that each member 20 terminates at its outer edge short of the outwardly and rearwardly curved outer edge of the rim member $2^a$ to which it is secured. The outer edge of each of the facing members 20 is concentric with the body of the rim member $1^a$ and provides a shoulder as indicated at 21. An inner and pneumatic tube 22 which may be of any suitable or preferred type of construction is partially received between the facing members 20 and has the inner peripheral wall thereof in abutting relation to the connecting strip 20'. The inner tube 22 thus will be spaced from the outer rim member $1^a$ and its rim flanges by a resilient elastic cushion.

A tread member $14^a$ which may be identical in essential respects with the tread member 14 fits over and covers the extending outer peripheral portion of the tube 22. The side members of the tread $14^a$ abut at their outer edges the shoulders 21 and the tread member $14^a$ thus is supported to have limited radial movement inward between the rim flanges $2^a$ but will be held against accidental displacement by the outer edge portions of the rim members $2^a$ when the tube 22 is inflated.

Obviously, my invention is susceptible of embodiment in forms other than those illustrated in the accompanying drawings and I therefore consider as my own all such modifications and adaptations of the forms of the device herein described as fairly fall within the scope of the appended claims.

I claim:—

1. A rim and tire construction comprising a rim member having a pair of rim flanges extending outward from the body thereof, a pneumatic tube encircling the body of said rim member and partially received between said rim flanges, said pneumatic tube having the portion thereof that is received between said rim flanges enlarged laterally outward to provide a pair of annular seat members, said seat members having the outer peripheral walls thereof located inwardly of the marginal edge portions of said rim flanges, and a tread member encircling said pneumatic tube and having side portions extending inwardly between the marginal edge portions of the rim flanges, the edges of said side portions of the tread member abutting the peripheral walls of said seat members.

2. A rim and tire construction comprising a rim member having a pair of rim flanges extending outward from the body thereof, a pneumatic tube encircling the body of said rim member and partially received between said rim flanges, said pneumatic tube having the portion thereof that is received between said rim flanges enlarged laterally outward to provide a pair of annular seat members, said seat members having the outer peripheral walls thereof located inwardly of the marginal edge portions of said rim flanges, and a tread member encircling said pneumatic tube and having side portions extending inwardly between the marginal edge portions of the rim flanges, the edges of said side portions of the tread member abutting the peripheral walls of said seat members, said seat members being relatively stiff and made of an elastic material.

3. A rim and tire construction comprising a rim member having a pair of rim flanges extending outward from the body thereof, a pneumatic tube encircling the body of said rim member and partially received between said rim flanges, a pair of annular seat members made of elastic material and extending between said pneumatic tube and said rim flanges, said seat members having the outer peripheral walls thereof located inwardly of the marginal edge portions of said rim flanges, and a tread member encircling said pneumatic tube and having side portions extending inwardly between the marginal edge portions of the rim flanges and the adjacent walls of said pneumatic tube, the edges of said side portions of the tread member abutting the peripheral walls of said seat members.

MICHAEL T. CONROY.

rim member and partially received between said rim flanges, said pneumatic tube having the portion thereof that is received between said rim flanges enlarged laterally outward to provide a pair of annular seat members, said seat members having the outer peripheral walls thereof located inwardly of the marginal edge portions of said rim flanges, and a tread member encircling said pneumatic tube and having side portions extending inwardly between the marginal edge portions of the rim flanges, the edges of said side portions of the tread member abutting the peripheral walls of said seat members.

2. A rim and tire construction comprising a rim member having a pair of rim flanges extending outward from the body thereof, a pneumatic tube encircling the body of said rim member and partially received between said rim flanges, said pneumatic tube having the portion thereof that is received between said rim flanges enlarged laterally outward to provide a pair of annular seat members, said seat members having the outer peripheral walls thereof located inwardly of the marginal edge portions of said rim flanges, and a tread member encircling said pneumatic tube and having side portions extending inwardly between the marginal edge portions of the rim flanges, the edges of said side portions of the tread member abutting the peripheral walls of said seat members, said seat members being relatively stiff and made of an elastic material.

3. A rim and tire construction comprising a rim member having a pair of rim flanges extending outward from the body thereof, a pneumatic tube encircling the body of said rim member and partially received between said rim flanges, a pair of annular seat members made of elastic material and extending between said pneumatic tube and said rim flanges, said seat members having the outer peripheral walls thereof located inwardly of the marginal edge portions of said rim flanges, and a tread member encircling said pneumatic tube and having side portions extending inwardly between the marginal edge portions of the rim flanges and the adjacent walls of said pneumatic tube, the edges of said side portions of the tread member abutting the peripheral walls of said seat members.

MICHAEL T. CONROY.

Certificate of Correction.

It is hereby certified that the name of the assignee in Letters Patent No. 1,574,277, granted February 23, 1926, upon the application of Michael T. Conroy, of Akron, Ohio, for an improvement in "Rim and Tire Constructions for Vehicle Wheels," was erroneously written and printed as "Henry M. Groue," whereas said name should have been written and printed as *Henry M. Grove*, as shown by the record of assignments in this office; and that the said Letters Patent should be read with this correction therein that the same may conform to the record of the case in the Patent Office.

Signed and sealed this 6th day of April, A. D. 1926.

[SEAL.]

M. J. MOORE,
*Acting Commissioner of Patents.*

Certificate of Correction.

It is hereby certified that the name of the assignee in Letters Patent No. 1,574,277, granted February 23, 1926, upon the application of Michael T. Conroy, of Akron, Ohio, for an improvement in " Rim and Tire Constructions for Vehicle Wheels," was erroneously written and printed as " Henry M. Groue," whereas said name should have been written and printed as *Henry M. Grove*, as shown by the record of assignments in this office; and that the said Letters Patent should be read with this correction therein that the same may conform to the record of the case in the Patent Office.

Signed and sealed this 6th day of April, A. D. 1926.

[SEAL.] M. J. MOORE,
*Acting Commissioner of Patents.*